(12) United States Patent
Connery et al.

(10) Patent No.: US 6,246,683 B1
(45) Date of Patent: Jun. 12, 2001

(54) RECEIVE PROCESSING WITH NETWORK PROTOCOL BYPASS

(75) Inventors: Glenn William Connery, Sunnyvale; Gary Jaszewski, Los Gatos; Richard Reid, Mountain View, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/071,692

(22) Filed: May 1, 1998

(51) Int. Cl.[7] .................................................. G08C 15/08
(52) U.S. Cl. .......................... 370/392; 370/395; 370/400; 370/412; 370/429; 709/250
(58) Field of Search .................................... 370/229, 253, 370/392, 338, 397, 349, 399, 412, 352, 389, 239, 401, 395, 400, 404, 428, 429, 351, 254, 258, 465, 469; 709/250

(56) References Cited

U.S. PATENT DOCUMENTS 5,917,820 * 6/1999 Rekhter ................................. 370/392
6,046,979 * 4/2000 Bauman ................................ 370/229

* cited by examiner

*Primary Examiner*—Dang Ton
*Assistant Examiner*—Anthony Ton
(74) *Attorney, Agent, or Firm*—McDonnell Boehnen Hulbert & Berghoff

(57) ABSTRACT

An adapter is provided with intelligence that allows it to separate the header parts of a packet being received from the payload it carries, and in most cases move the payload directly into a destination buffer at the application layer or file system layer. Copies by the intermediate layers of the protocol stack are bypassed, reducing the number of times that the payload of a communication must be copied by the host system. At the network interface, a plurality of packets is received, and the payload of each is bypassed directly into the target destination buffer. The network interface device identifies the packets which are in the sequence of packets carrying payload to be stored in the target buffer by the flow specification carried with such packets. Also, the packets carrying data payload for the file include a sequence number or other identifier by which the network interface is able to determine the offset within the target buffer to which the packet is to be stored.

20 Claims, 4 Drawing Sheets

RECEIVE PROCESSING WITH NETWORK PROTOCOL BYPASS

BACKGROUND OF THE INVENTION

1. Field of the Invention

The present invention relates to processing of data in communication networks, and more particularly to the process of receiving a plurality of packets of data which relate to a common block of data, and efficiently providing such data to an application.

2. Description of Related Art

Network communications are often described with respect to layers of network protocols. According to a standard description, the layers include the physical layer, the datalink layer, the network layer (also called routing layer), the transport layer, and the application layer. Thus modem communication standards, such as the Transport Control Protocol TCP, the Internet Protocol IP, and IEEE 802 standards, can be understood as organizing the tasks necessary for data communications into layers. There are a variety of types of protocols that are executed at each layer according to this model. The particular protocols utilized at each layer are mixed and matched in order to provide so called protocol stacks or protocol suites for operation of a given communication channel.

The protocol stacks typically operate in a host system which includes a network adapter comprised of hardware that provides a physical connection to a network medium, and software instructions referred to as medium access control MAC drivers for managing the communication between the adapter hardware and the protocol stack in the host system. The adapter generally includes circuitry and connectors for communication over a communication medium, and translates the data to and from the digital form used by the protocol stack and the MAC driver, and a form that may be transmitted over the communication medium.

Generally according to this model, processes at the application layer, including applications and file systems, rely on the lower layers of the communication protocol stack for transferring the data between stations in the network. The application layer requests services from the protocol stack which includes transport layer, network layer and datalink layer processes distributed between the MAC driver and other components of the stack. In a similar way, data which is received across the network is passed up the protocol stack to the application layer at which actual work on the data involved is accomplished.

In current implementations, received packets are generally moved sequentially into host buffers allocated by the MAC driver for the adapter, as they arrive. These buffers are then provided to the host protocol stack, which generally copies them once or twice to internal buffers of its own before the payload data finally gets copied to the application or the file system buffer. This sequential passing of the data up the protocol stack is required so that the processes in the particular protocol suite are able to individually handle the tasks necessary according to the protocol at each layer. However, these multiple copies of the data hurt performance of the system. In particular, the CPU of the computer is used for each copy of the packet, and a significant load is placed on the memory subsystem in the computer. With technologies like gigabit Ethernet, and other technology in which the data rates of the physical layer of the network is increasing, these copy operations may become an important limiting factor in improving performance of personal computer architectures to levels approaching the capability of the networks to which they are connected.

Accordingly, it is desirable to provide techniques which avoid one or more of these copies of the packets as they pass up the protocol stacks. By eliminating multiple copies of the packet, the raw performance of the receiving end station can be increased, and the scalability of the receive process can be improved.

SUMMARY OF THE INVENTION

According to the present invention, an adapter is provided with intelligence that allows it to separate the header parts of a packet being received from the payload it carries, and in most cases move the payload directly into a destination buffer at a higher layer, such as the application layer. Thus reducing the number of times that the payload of a communication must be copied by the host system.

Accordingly, the invention can be characterized as a method for transferring data on a network from the data source to an application executing in an end station. The application operates according to a multi-layer network protocol which includes a process for generating packet control data (e.g. headers) for packets according to the multi-layer network protocol. Packets are received at the network interface in a sequence carrying respective data payloads from the data source. Upon receiving a packet, the control data of the packet is read in the network interface, and if the packet belongs to a flow specification subject of the bypass, the data payload of the packet is transferred to a buffer assigned by a layer higher in the stack, preferably by the application or file system, bypassing one or more intermediate buffers of the protocol stack.

Typically, to initiate the process of receiving a plurality of packets which make up a block of data for a particular application, the process involves establishing a connection between the end station and the source of data, such as a file server on a network, for example according to the TCP/IP protocol suite. A request is transmitted from the application through the network interface which asks for transfer of the data from the data source. The request and the protocol suite provide a flow specification to identify the block of data and an identifier of the target buffer. At the network interface, the plurality of packets is received, and their control fields, such as TCP/IP headers, are read. If they fall within the set up flow specification, the payloads are bypassed directly into the target buffer. The network interface device identifies the packets which are in the sequence of packets carrying payload to be stored in the target buffer by the control data in headers carried with such packets. Also, according to a preferred aspect of the invention, the packets carrying data payload for the block of data include a sequence number or other identifier by which the network interface is able to determine the offset within the target buffer to which the payload of the packet is to be stored. In this case, the flow specification includes a range of sequence numbers for the block of data, such as by a starting number and a length number.

According to yet another aspect of the invention, the network protocol executed by the protocol stack includes TCP/IP, and the process for requesting the transfer of a file from a data source involves issuing a read request according to higher layer protocol, such as the READ RAW SMB (server message block) command specified according to the Common Internet File System protocol (See, paragraph 3.9.35 of CIFS/1.0 draft dated Jun. 13, 1996) executed in Windows platforms. The target buffer is assigned by the host application using an interface like WINSOCK, or a file system, in a preferred system. In alternatives, the target buffer is assigned by a transport layer process like TCP, to provide for bypassing of a copy in a network layer process like IP.

Accordingly, the present invention provides a technique by which the performance and scalability of a network installation, like a TCP/IP installation, can be improved, especially for high physical layer speeds of 100 megabits per second or higher. Also, the invention is extendable to other protocol stacks in which a read bypass operation could be executed safely.

Other aspects and advantages of the present invention can be seen upon review of the figures, the detailed description and the claims which follow.

DETAILED DESCRIPTION

Figure 1:
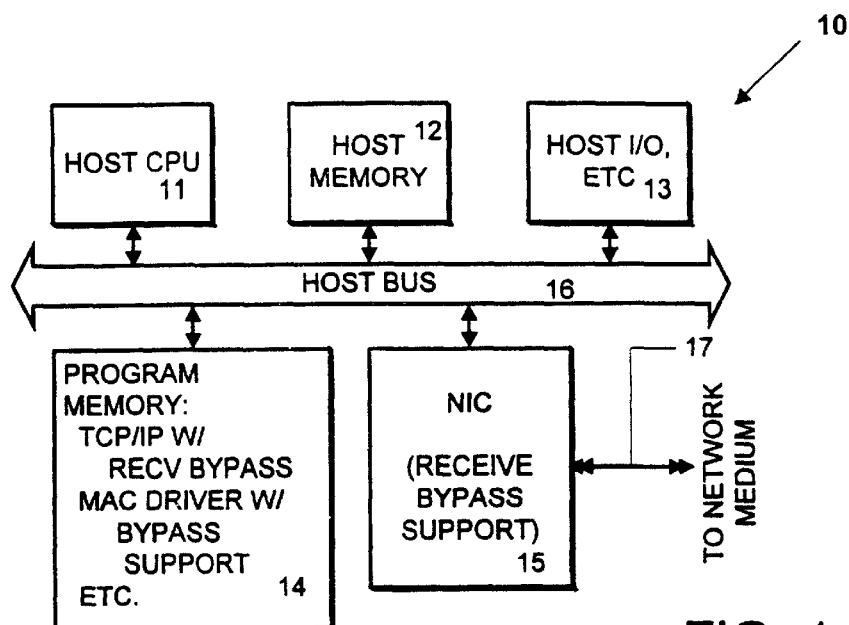
FIG. 1 is a simplified diagram of an end station in a network including receive bypass support according to the present invention.
Figure 2:
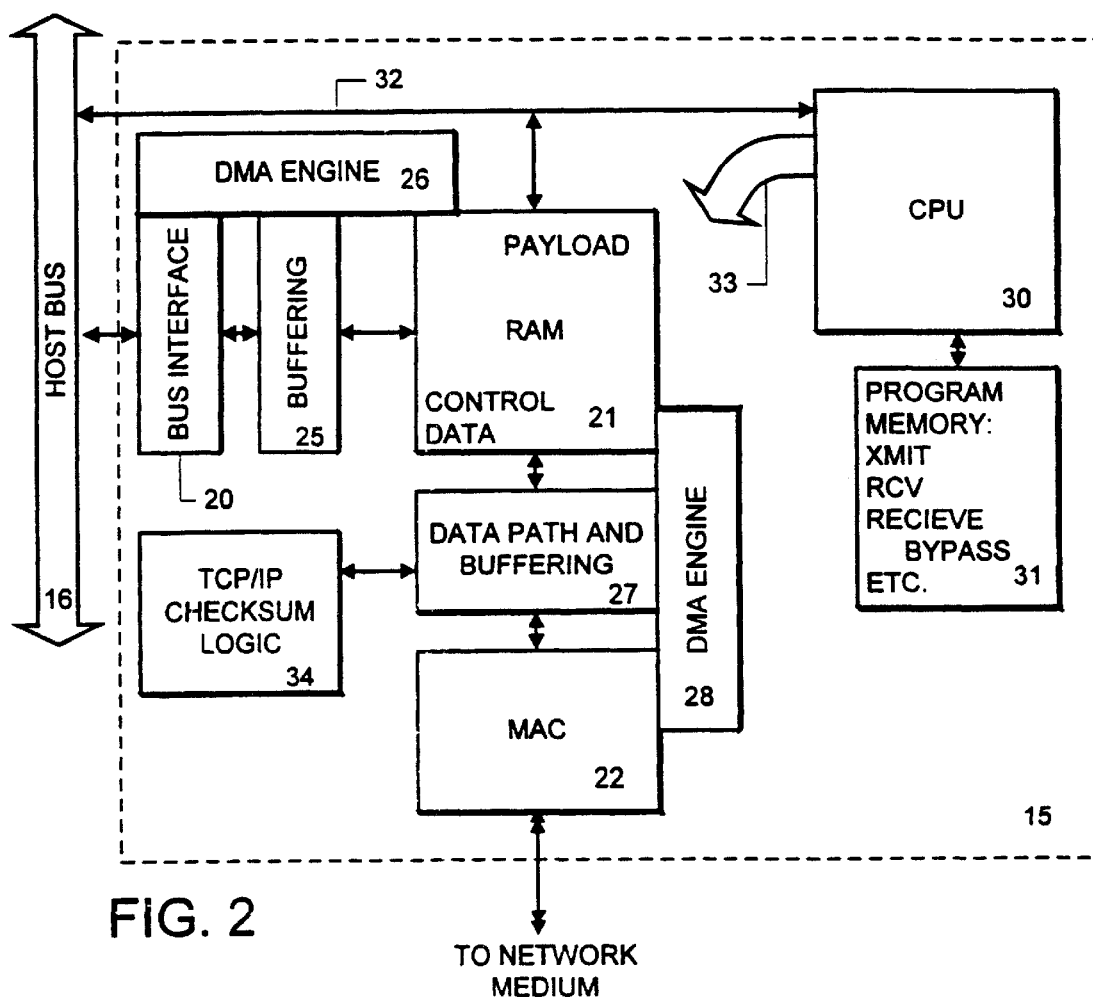
FIG. 2 is a simplified diagram of a network interface card supporting the receive bypass processes of the present invention.

A detailed description of the present invention is provided with respect to FIGS. 1–5, in which FIGS. 1 and 2 illustrate a hardware system environment.

FIG. 1 shows a data processing system 10 which includes a host central processing unit 11, host memory 12, host input/output 13, such as keyboards, displays, printers, a pointing device and the like. The system also includes program memory 14 (usually part of the host memory block) and a network interface card 15. All of these elements are interconnected by a host system bus 16. The network interface card 15 provides for connection to a network medium as indicated at line 17.

FIG. 1 is a simplified diagram of a computer such as a personal computer or workstation. The actual architecture of such system is quite varied. This system for one example corresponds to a personal computer based on the Intel microprocessor running a Microsoft Windows operating system. Other combinations of processor and operating system are also suitable.

According to the present invention, the program memory includes a TCP/IP protocol stack with a receive bypass mode according to the present invention. A MAC driver is also included in the program memory which supports the receive bypass mode. Other programs are also stored in program memory to suit the needs of a particular system. The network interface card 15 includes resources to manage TCP/IP processing and bypass according to the present invention.

FIG. 2 provides a simplified block diagram of a network interface card 15 capable of supporting the present invention. The network interface card 15 includes a bus interface 20 coupled to the host bus 16. A memory composed of random access memory RAM 21 is included on the card 15. Also, a medium access control unit 22 is coupled to the card which is coupled to the network medium 17. In the path from the host bus interface 20 to the RAM 21 includes appropriate buffering 25 and a direct memory access (DMA) engine 26 in order to offload processing from the host system for transferring data packets into the RAM 21. Also the data path from the RAM 21 to the medium access control unit 22 includes appropriate data path and buffering logic 27 to support efficient transmission and reception of packets. A DMA engine 28 is also included on this path to provide for efficient transferring of data between the network medium 17 and the RAM 21. Also included on the card 15 is a central processing unit 30 having a program memory 31. The CPU 30 is coupled to the host bus 16 and to the RAM 21 on line 32. Also the CPU 30 generates control signals represented by the arrow 33 for controlling other elements in the network interface card 15. According to this embodiment, TCP/IP checksum logic 34 is coupled to the data path and the buffering logic 27 in the path from the RAM 21 to the network medium 17. The program memory for the CPU 30 includes transmit, receive, TCP/IP receive bypass control and other processes which manage the operation of the smart network interface card.

The block diagram illustrated in FIG. 2 provides a simplified overview of the functional units in a network interface according to the present invention. A variety of other architectures could be implemented to achieve similar functions. For example, DMA engines 26, 28 are not strictly required here. State machines hand-shaking with each other, or other data processing resources could move data from one block to the next.

In one embodiment, all of these elements are implemented on a single integrated circuit. In another embodiment, all elements of the network interface card except for the RAM 21 are implemented on a single integrated circuit. Other embodiments include discreet components for all of the major functional blocks of the network interface card.

Figure 3:
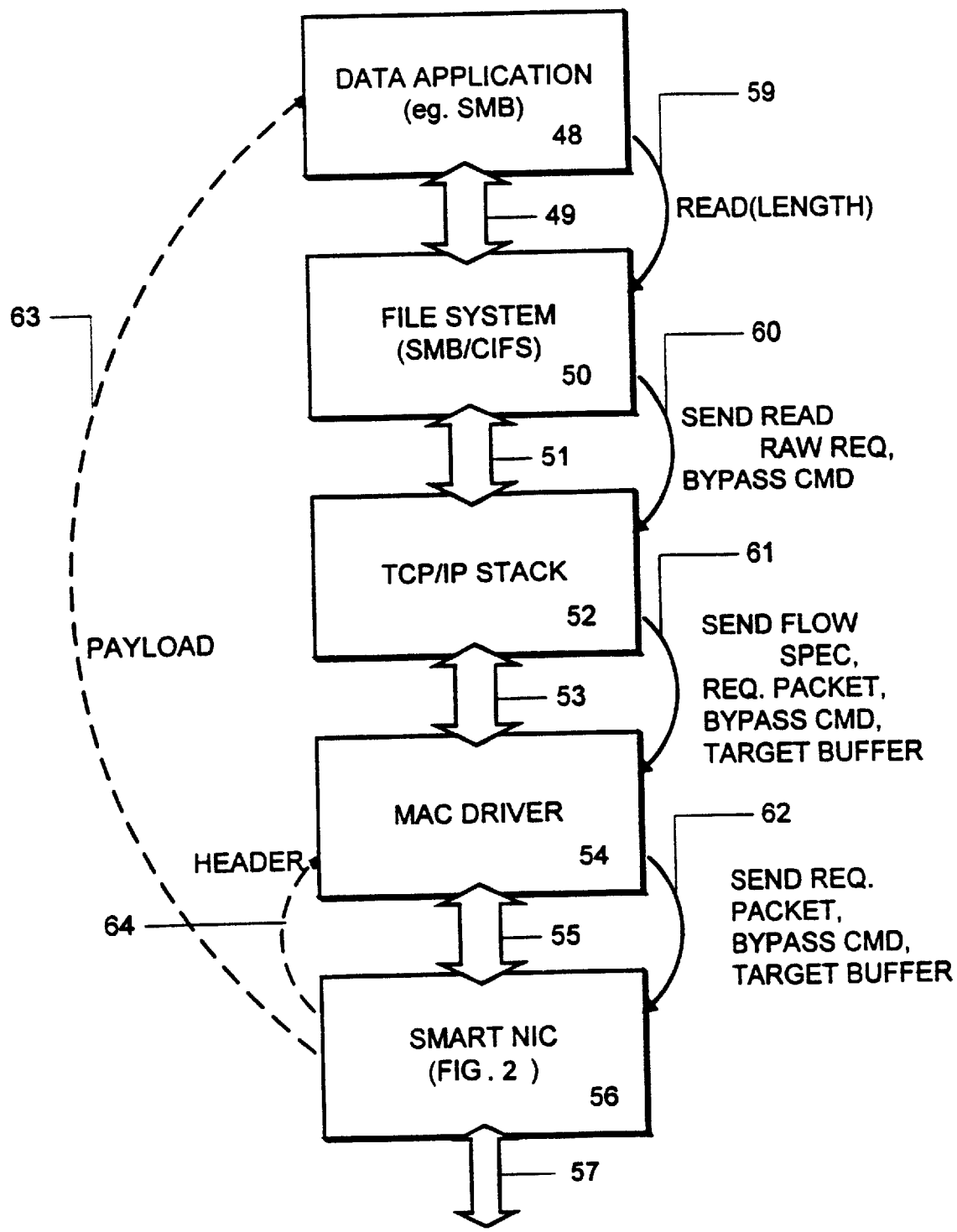
FIG. 3 is a heuristic diagram of a protocol stack including the read bypass process of the present invention.

FIG. 3 is a simplified diagram of the network protocol layers implemented according to the present invention. The protocol layers in this example include a data application 48 such as an application layer program, coupled by path 49 to a file system 50 running CIFS in an end station. The file system 50 is coupled by a path 51 to the TCP/IP stack 52. The TCP/IP stack 52 is coupled by path 53 to the MAC driver 54. The MAC driver is coupled by path 55 to the smart network interface card 56. The smart network interface card 56 is coupled by path 57 to the network medium.

In alternative systems, application layer processes (like process 48) issue read requests through an application program interface (API) like WINSOCK for Windows platforms, rather than a file system (like CIFS).

According to the example in FIG. 3, the application layer process 48 (such as Lotus Notes or others), issues a request 59 to read a file of data across the network from a data source such as by the equivalent of fget (buffer length), in the "C" programming language. The file system 50 sets up a bypass, then formats the READ RAW SMB request 60 and passes it down. Such a request 25 corresponds for example to the READ RAW SMB command found in the CIFS protocol. Of course, analogous commands and other application layer processes could be utilized. The READ RAW request is passed down the protocol stack to the driver and transferred across the network to the file server or other data source which is the source of the file to be retrieved. The file server then sends a sequence of packets according to the SMB READ RAW response protocol.

The TCP/IP stack according to the present invention makes a call 61 to the MAC driver, passing to it the identification of a target buffer assigned by the application layer process, or by another process above the network layer. This identification may be an array of physical or virtual addresses, such as an address and a length, which can be utilized by the MAC driver to copy the data directly from the memory on the smart network interface card into the target buffer. Also, the call made by the TCP/IP stack sends down to the MAC driver the flow specification established for this read beforehand, including the source and destination IP addresses, and the source and destination port numbers (i.e. sockets). Also the flow specification includes a SEQorigin and a SMBfirst flag in this example. In turn, the MAC driver provides the request and associated control information by a transfer 62 to the smart adapter 56. The target buffer specifies where the payload should be stored when possible by the network interface card. The flow specification specifies how to identify packets that are part of this session. The SEQorigin specifies the sequence number of the first byte of the payload (excluding any SMB header) that should be stored in the target buffer. The SMBfirst flag tells the driver whether the first packet with that sequence SEQorigin will have a SMB header following its TCP header. This information is used so that the control data can be cut from the first packet in the plurality of packets which are received in response to the read request.

Using this information, when the adapter receives packets in the session, it puts the payload data directly (line 63) into the target buffer. There is no guarantee that the adapter will always do this; however it will be done most of the time when a target buffer has been supplied. Such received packets are passed up to the protocol one at a time as always, using the same interfacing data structures as always. The only difference is that the packet will be split across two fragments. The header (Ethernet, IP, TCP and possible SMB headers) will be the first fragment on line 64, and will occupy a driver allocated buffer as always for use in identifying the packet, and for protocol maintenance functions. However, the payload will occupy a second fragment on line 63 which has been copied to the offset within the target buffer determined by the SEQ parameter in the header. The driver figures out the offset in the target buffer from the SEQ number in the header of the incoming packet. The offset into the target buffer is simply determined by the SEQ in the packet less the SEQorigin parameter which is provided with the READ RAW request. According to one implementation, if the packets which are responsive to the read request come to the adapter out of order, they will not be redirected to the target buffer until the first packet with the SMB header carried in is received. At that point, the size of the SMB header is easily calculated, and the amount to adjust the calculation for directly loading into the target buffer can be readily determined.

This approach allows both data that is targeted at the file system cache buffers to skip one or more copies or application layer reads. However, it need not be used to its full potential to be worthwhile. Even if one copy operation can be skipped the invention might be useful. Thus, according to an alternative embodiment the target buffers are assigned at the TCP layer rather than at the application layer. The TCP buffer target address is passed down to the MAC driver, allowing the packet to skip the copy at the IP layer.

Other protocols can be handled as well, such as the IPX and the NetBEUI/Data Link Control (DLC) protocols. Although these protocols do not use SEQ numbers which act as byte counters, but rather use packet numbers as part of the flow specification provided to the adapter. Thus, the problem of calculating the offset into the target buffer is complicated. However, if all packets in the read request are constrained to the same size, except for the last packet, the target buffer offset can be easily determined. Alternatively, the bypass might only be performed on packets received in order. Additional calculations on the smart network adapter card can also provide the memory offsets. Similarly file system protocols other than CIFS are possible, such as FTP or NFS.

According to some embodiments of the present invention, the network adapter has resources which enable it to determine that a received packet has good data, such as checksum checking logic and the like, before transferring it up to the target buffer. The smart network adapter has the capability to maintain a record of the parts of the target buffer which have been filled in with good packets and not overwrite them. This addresses a feature of the TCP/IP protocol by which there is no guarantee that payload bytes will arrive in order, or that if they are retransmitted that they will be retransmitted in the same size chunks. Thus, the file server might send part of a previous packet along with some new data. The adapter in this embodiment is capable of properly handling this condition because of its record of the good data already stored in the target buffer.

Figure 4:
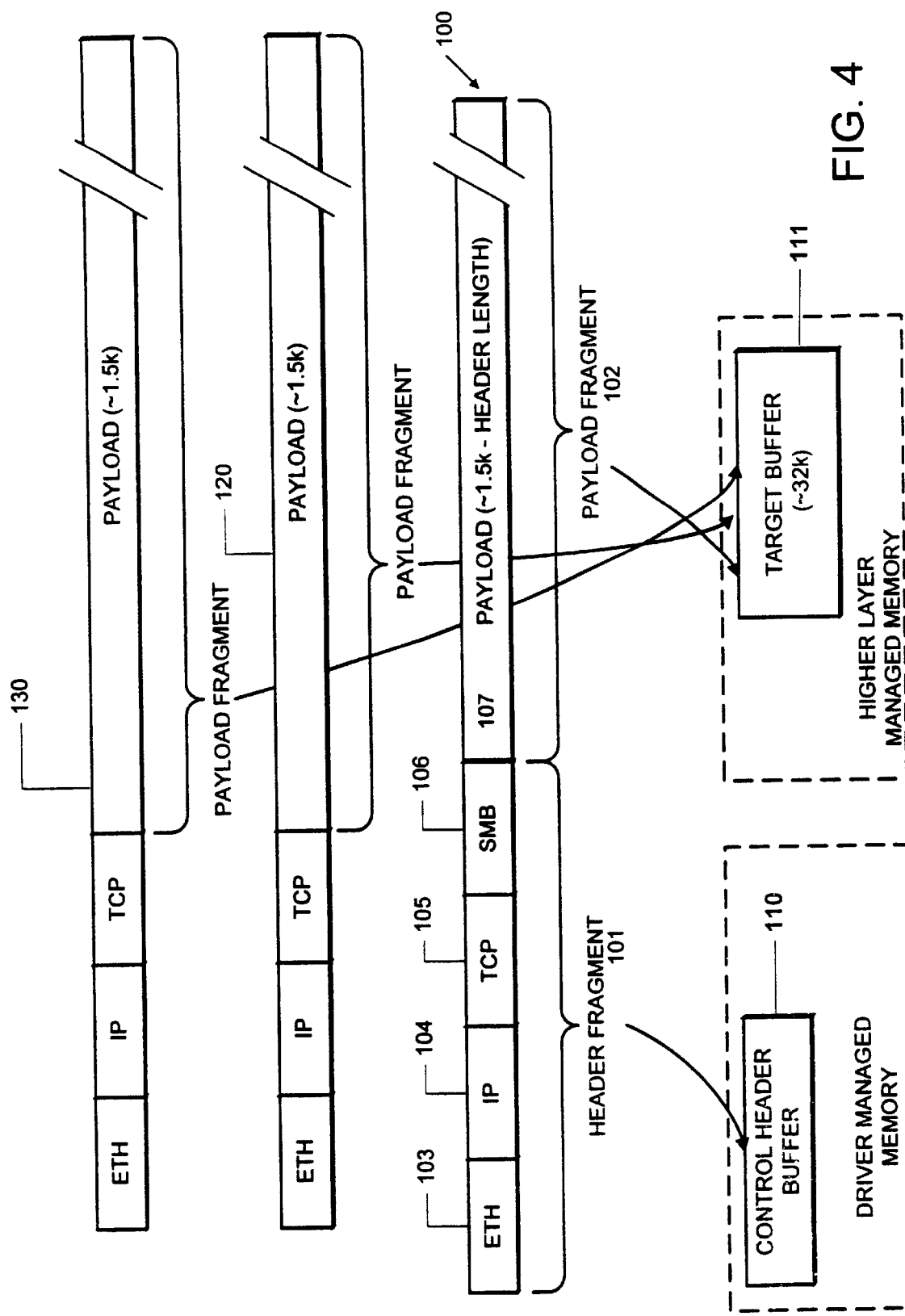
FIG. 4 is a diagram illustrating the packet structure and processing according to the read bypass operation of the present invention.

FIG. 4 illustrates the packet structure and the process of the present invention as the packets are received for a response to a READ RAW SMB request according to the CIFS protocol. As can be seen in FIG. 4, there is a first packet in the sequence generally 100 which carries a header fragment 101 and a payload fragment 102. The header fragment includes in this example an Ethernet header 103, an Internet Protocol header 104, a TCP header 105, and a SMB header 106. The data payload 107 makes up the payload fragment 102. For a standard Ethernet style packet, the payload will have about 1.5 kilobytes of data. According to the present invention, the smart network adapter receives the packet 100 and ensures that it is a good packet by performing the IP and TCP checksum processes. Also, the header fragment 101 is cut off of the packet 100 and transferred to a control header buffer 110 which is stored in driver managed memory. The payload fragment 102 is transferred to the target buffer 111 in the application managed memory according to the target buffer addresses stored in the network interface card.

According to the READ RAW SMB process, subsequent packets in the sequence, including packet 120 and packet 130 do not carry SMB headers like the header 106 in the first packet 100. The subsequent packets are received by the smart network interface card and the TCP/IP flow specification is used to identify them as part of the READ RAW response. Once they are identified by the network interface card as part of the response, they are uploaded into the target buffer 111 at an offset determined by the SEQ parameter in the TCP header. The header fragments of the packets 120 and 130 can be passed up the protocol stack to ensure that the protocol stack is properly apprised of the sequence of packets being received.

Normally a received packet is placed in a buffer allocated by the driver and then passed up to the protocol stack in a data structure that consists of one or more fragments identified by respective pointers and lengths. The total sum of the fragments in order makes up the entire packet. Often, the packet is passed up in one piece, and there is not a second fragment. But in some cases, such as in a transmit loop back, the packet is divided into several fragments which are passed back up to the protocol stack. Thus the protocol stack is normally configured to handle packets which are passed up in several fragments. According to the present invention, the packet is divided into two fragments, including the header which is placed in the buffer allocated by the driver identified by a pointer to the buffer location, and the payload which is placed in the target buffer and identified by a pointer to the target buffer. The identifiers of the two fragments are passed up the protocol stack by making a call to the receive function in the next layer, and passing the fragment identifiers up with the call. This allows the packet to be processed normally through the protocol stack. At the application layer, or at the layer of the target buffer, the protocol or the application would be modified according to one implementation of the invention to compare the address of the fragment with the address of the buffer into which this layer of the stack intends to copy the fragment. If these two addresses match, then the copy is not executed. The copy would not be necessary because the adapter had already copied the payload into the target buffer. Thus, very little modification of the protocol stack is necessary in order to execute the present invention.

Figure 5:
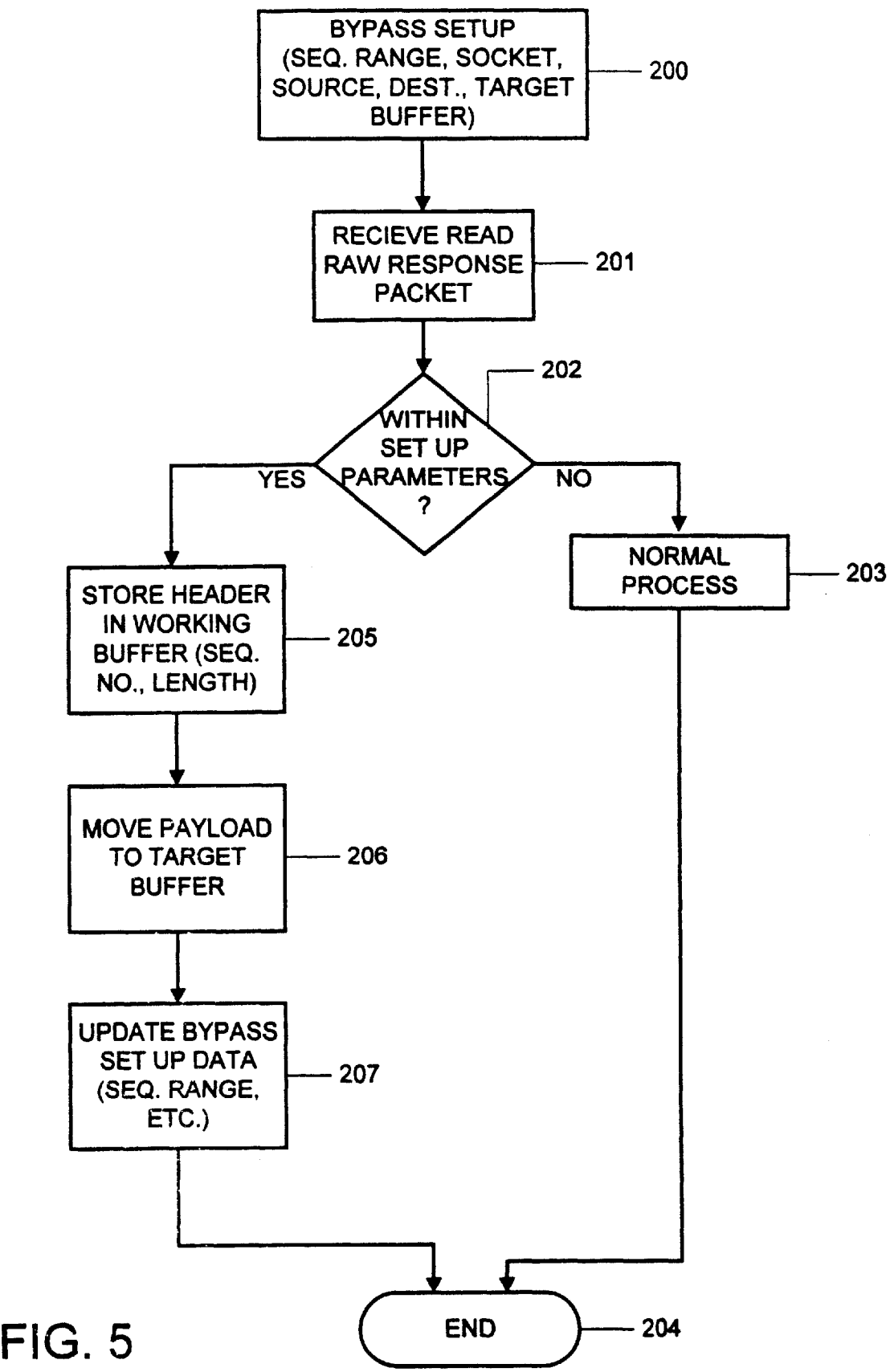
FIG. 5 is a flow diagram of the process executed for setting up and receiving packets in response to a READ RAW request.

FIG. 5 illustrates the process executed by the network interface card and MAC driver according to the present invention. In the network adapter the bypass is set up by storing a flow specification for the block of data that will be subject of the receive bypass. The flow specification includes for example a sequence number range, socket numbers, and source and destination addresses, of packets which will be part of the flow, and a target buffer to which the payload is to be written (block 200). This data is provided to the network adapter from a higher layer in the protocol stack. Once the bypass is set up, the adapter is able to receive packets which are part of that flow specification. For example, in one example the packets are expected to be responses from a READ RAW request for a block of data (block 201). The network adapter upon receiving the packet, and before passing the packet up the stack determines whether the packet falls within the set up that defines the flow specification for this read bypass session (block 202). If not, then the packet is processed normally (block 203) and the algorithm ends (block 204). If the packet falls within the set up parameters at block 202, then the header of the packet is stored in a working buffer accessible by the driver, including the sequence number and length parameters from the header (block 205). Using this data, the protocol stack is capable of performing protocol maintenance functions necessary for maintaining the session. Also the payload is moved directly to the target buffer (block 206). The payload move process may occur before, after or in parallel with storing the header in the working buffer. Next, if necessary for a given implementation, the set up data for the receive bypass is updated based on the information in the header (block 207). Finally the process ends (block 204).

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for transferring data on a network from a data source to an end station executing a multi-layer network protocol, including a network layer and at least one higher layer, through a network interface on the end station, comprising:
   receiving in the network interface a packet which carries a data payload from a block of data in the data source, and a control field identifying the packet;
   determining based on the control field in the network interface whether the packet matches a flow specification, and if so transferring the data payload in the packet directly to a target buffer assigned by a process at a layer higher than the network layer.

2. The method of claim 1, wherein the control field in the packet includes a packet header.

3. The method of claim 1, wherein the multi-layer network protocol comprises TCP/IP, and the control field comprises a TCP/IP header.

4. The method of claim 1, including prior to receiving the packet, allocating the target buffer for the plurality of packets, and notifying the network interface of the allocated target buffer.

5. The method of claim 1, the network interface is coupled to a network medium supporting a maximum packet size, and including transmitting a request from an application for transfer of a block of data from the data source, the block of data having a length potentially greater than the maximum packet size for the medium.

6. The method of claim 5, including notifying the network interface in response to the request of a flow specification for the block of data according to the multi-layer network protocol, and wherein the step of receiving the packet includes identifying packet using the flow specification.

7. The method of claim 6, wherein the network protocol comprises TCP/IP, and the flow specification includes a sequence number of a first byte from the plurality of packets to be stored in the target buffer.

8. The method of claim 1, wherein the flow specification includes a sequence number for the block of data.

9. The method of claim 8, wherein the flow specification includes IP source and destination addresses and TCP port numbers.

10. A method for transferring data on a network from a data source to an end station executing a multi-layer network protocol through a network interface on the end station, including medium access control layer processes, comprising:
    establishing a connection with a destination for a session according to a network protocol;
    transmitting a request for transfer of a block of data from the data source, and providing a flow specification and an identifier of a target buffer to the network interface;
    receiving in the network interface a plurality of packets which carry respective data payloads, packets in the plurality of packets including control fields identifying whether the packet falls within the flow specification of the block of data,
    upon receiving a packet, determining in the network interface whether the packet falls within the flow specification, and if so transferring the data payload to the target buffer.

11. The method of claim 10, wherein the control field in the first packet includes a packet header.

12. The method of claim 10, wherein the network protocol comprises TCP/IP, and the packet control data comprises a TCP/IP header.

13. The method of claim 10, wherein the network protocol comprises TCP/IP, and the flow specification includes a sequence number of a first byte from the plurality of packets to be stored in the target buffer.

14. The method of claim 10, wherein the flow specification includes a sequence number for the block of data.

15. The method of claim 14, wherein the flow specification includes IP source and destination addresses and TCP port numbers.

16. A method for transferring data on a network from a data source to an end station executing a TCP/IP network protocol through a network interface on the end station including medium access control layer processes below TCP/IP, comprising:

establishing a connection with a destination for a session according to the TCP/IP network protocol;

transmitting a request from a application, for transfer of a block of data from the data source, and providing a flow specification for the block of data and an identifier of a target buffer to the network interface;

receiving in the network interface a plurality of packets which carry respective data payloads from the block of data in the data source, and each packet in the plurality of packets including a TCP/IP header, upon receiving each packet, determining in the network interface whether the packet falls within the flow specification, and if so transferring a data payload to the target buffer.

17. The method of claim 16, wherein the flow specification includes a sequence number for bytes of data in the block of data.

18. The method of claim 17, wherein the flow specification includes IP source and destination addresses and TCP port numbers.

19. The method of claim 16, wherein the target buffer comprises a buffer assigned at the TCP layer or higher.

20. The method of claim 16, wherein the target buffer comprises a buffer assigned at a layer higher than the TCP layer.

* * * * *